United States Patent
Sawada

[19]

[11] Patent Number: 5,982,940
[45] Date of Patent: Nov. 9, 1999

[54] IMAGE DATA PROCESSING DEVICE AND METHOD OF PROCESSING IMAGE DATA

[75] Inventor: Kenichi Sawada, Toyokawa, Japan

[73] Assignee: Minolta Co., Ltd., Osaka, Japan

[21] Appl. No.: 08/741,933

[22] Filed: Oct. 31, 1996

[30] Foreign Application Priority Data

Nov. 1, 1995 [JP] Japan .................................. 7-284707

[51] Int. Cl.⁶ ............................................... G06K 9/40
[52] U.S. Cl. ........................... 382/260; 382/267; 382/269
[58] Field of Search ..................... 382/260, 261, 382/267, 269, 205, 190, 194, 195, 197

[56] References Cited

U.S. PATENT DOCUMENTS

| | | | |
|---|---|---|---|
| 4,541,116 | 9/1985 | Lougheed | 382/260 |
| 5,317,420 | 5/1994 | Kuwahara | 358/463 |
| 5,333,211 | 7/1994 | Kanda et al. | 382/261 |

FOREIGN PATENT DOCUMENTS

| | | |
|---|---|---|
| 0 572 956 A2 | 12/1993 | European Pat. Off. . |
| 0 657 839 A2 | 6/1995 | European Pat. Off. . |
| 60-53982 | 11/1985 | Japan . |

*Primary Examiner*—Thomas D. Lee
*Attorney, Agent, or Firm*—Burns, Doane, Swecker & Mathis, LLP

[57] ABSTRACT

A plurality of regions are set for input image data formed of a plurality of pixels. A characteristic parameter for each region is extracted in accordance with a state of distribution in each region. Vectors representing relationships between the regions are calculated based on the extracted characteristic parameters. A filter is produced in accordance with the calculated vector. Using the filter, the image data is filtered. In this manner, jaggies, discontinuities and satellite dots appearing at characters and lines of the image are removed and corrected.

34 Claims, 7 Drawing Sheets

FIG. 5(A)
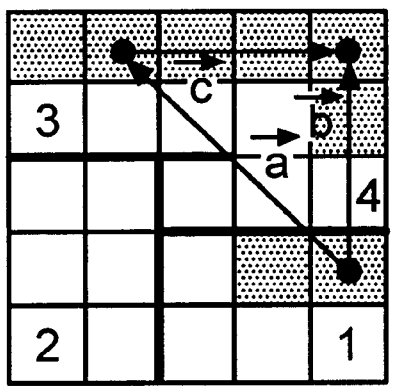
■ : black pixel
● : centroid
FIG. 5(B)
| - | 0 | 0 | 0 | 0 |
|---|---|---|---|---|
| - | - | 0 | 0 | 0 |
| - | - | - | 0 | 0 |
| - | - | - | - | 0 |
| - | - | - | - | - |
FIG. 5(C)
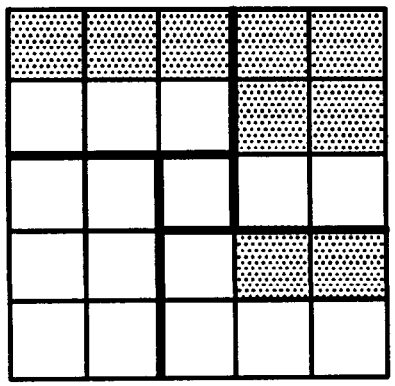

FIG. 6(A)
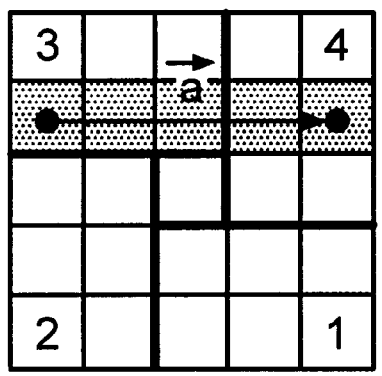
▨ : black pixel
● : centroid
FIG. 6(B)
FIG. 6(C)
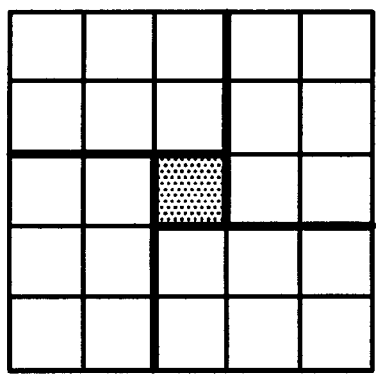
FIG. 7
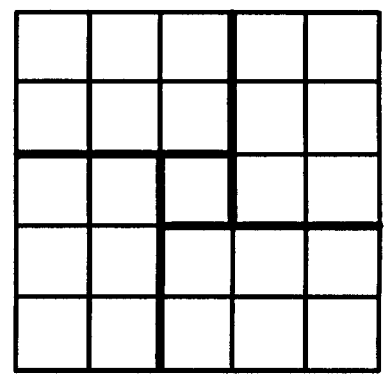

● : centroid

IMAGE DATA PROCESSING DEVICE AND METHOD OF PROCESSING IMAGE DATA

BACKGROUND OF THE INVENTION

1. Field of the Invention

The present invention relates to image data processing for correcting jaggies, discontinuities and satellite dots at characters and thin lines in an image.

2. Description of the Related Art

Various jaggies appear at edges of characters and line images, which are produced by binarization of multivalued images.

For example, Japanese Patent Publication No. 60-53982 (53982/1985) has disclosed the following technique in connection with jaggy correction for binary images. In this technique, binary signals representing black and white and produced from image signals are not immediately encoded. Alternatively, when a situation of signal generation for a certain section or period of the binary signals satisfies predetermined conditions with respect to the primary scanning direction or subscanning direction, predetermined portions of the signals within the above section are corrected from the white signal to the black signal or vice versa, whereby it is possible to prevent encoding of complicated border lines of the image without another processing before transmission. Based on assumption that, for example, the probability of existence of characters and thin lines having one picture element width is low, a series of signals may include continuous black signals for two or more picture elements, which are followed by a white signal for only one picture element further followed by continuous black signals for two or more picture elements. In this case, only the white signal for one picture element is corrected into a black signal. Alternatively, In the case where continuous white signals for two or more picture elements are followed by a black signal for only one picture element, which are further followed by continuous white signals for two or more picture elements, only the black signal for one picture element is corrected into the white signal. In the case where black and white signals each for one picture element alternately appear one by one, all the signals in each alternating section are corrected into black or white signals. In these manners, jaggies on binary images and satellite dots are corrected and removed.

Here, the satellite dots are dots which are present near edges of images (generally, within a range of about 500 $\mu$m from edges).

However, the binary image processing is performed with respect to only the main scanning direction and subscanning direction, so that jaggies appearing at directions other than the above cannot be corrected.

The following means for correcting jaggies have generally been known:

(1) Noise removal filtering with a fixed nonlinear filter.

(2) Filtering with pattern matching.

(3) Noise removal filtering with tracing in an edge direction.

In the above measures (1), the nonlinear filter is effective to noises appearing unsteadily and therefore is suitable to jaggies on images. However, since the measures (1) use a preset fixed filter, it is impossible to remove jaggies, discontinuities and satellite dots appearing aperiodically in various forms. The measures (2) and (3) employ filters which are variable with respect to local images to be noted or processed. However, the measures (2) require setting of a large number of patterns for processing various forms, and therefore are not practical. The measures (3) cannot easily perform labeling, and therefore are not practical.

SUMMARY OF THE INVENTION

Accordingly, it is an object of the invention to provide an image data processing device and a method of processing an image data, which can correct jaggies, discontinuities and satellite dots appearing at characters and thin line images regardless of their forms of generation.

In order to achieve the above object, the present invention provides:

(A) an image data processing device including:

input means for inputting image data of a plurality of pixels;

extraction means for setting a plurality of regions for the input image data and extracting characteristic parameters of the respective regions in accordance with states of distributions of the pixels in the respective regions, respectively;

calculating means for calculating vectors representing relationships between the regions based on the characteristic parameters extracted by the extraction means;

producing means for producing filters in accordance with the calculated vectors; and means for filtering the image data with the produced filters.

In order to achieve the above object, the present invention also provides:

(B) an image data processing device including:

input means for inputting image data of a plurality of pixels;

extraction means for setting a plurality of regions for the input image data and extracting characteristic parameters of the respective regions in accordance with states of distributions of the pixels in the respective regions, respectively;

detecting means for detecting correlations between the regions based on the characteristic parameters extracted by the extraction means;

producing means for producing filters in accordance with the detected correlations; and means for filtering the image data with the produced filters.

In order to achieve the above object, the present invention further provides:

(C) an image data processing device including:

input means for inputting image data of a plurality of pixels;

detecting means for detecting correlations between the pixels based on a pixel distribution of the image data;

producing means for producing filters in accordance with the detected correlations; and means for filtering the image data with the produced filters.

In order to achieve the above object, the present invention provides:

(D) a method of processing image data including the steps of:

(a) setting a window formed of a plurality of pixels for image data, said window having a plurality of subwindows each formed of a plurality of pixels;

(b) extracting a characteristic parameter for each of the subwindows based on a state of distribution of the pixels in each of the subwindows;

(c) calculating vectors representing relationships between the subwindows based on the extracted characteristic parameters;

(d) producing a filter in accordance with the calculated vectors;

(e) filtering the image data with the produced filter; and (f) shifting a position of the window with respect to the image data and repeating the steps (a)–(e).

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5(A)–5(C) represent an example of processing in a case where three centroids are detected in the reference window, and FIGS. 5(A), 5(B) and 5(C) specifically show a vector calculating method, a produced filer and a result of filtering, respectively;

FIGS. 6(A)–6(C) represent an example of processing in a case where two centroids are detected in the reference window, and FIGS. 6(A), 6(B) and 6(C) specifically show a vector calculating method, a produced filer and a result of filtering, respectively;

FIG. 7 shows processing of removing satellite dots in a binary input image;

FIGS. 8(A), 8(B) and 8(C) show a vector calculating method, a non-weighted filter and weighted filter, respectively, while FIGS. 8(D) and 8(E) show a result of processing with an operator provided by the filter shown in FIG. 8(B) and a result of processing with an operator provided by the filter shown in FIG. 8(C), respectively;

FIG. 9(A) shows, as an example for comparison, an image prepared by binarizing a multivalued image in an error diffusion method and FIG. 9(B) shows an image produced by processing the binary image according to the invention; FIG. 10(A) shows, as an example for comparison, an image prepared by binarizing a multivalued image in an error diffusion method and FIG. 10(B) shows an image produced by processing and binarizing the same multivalued original image according to the invention.

DESCRIPTION OF THE PREFERRED EMBODIMENTS

Figure 1:
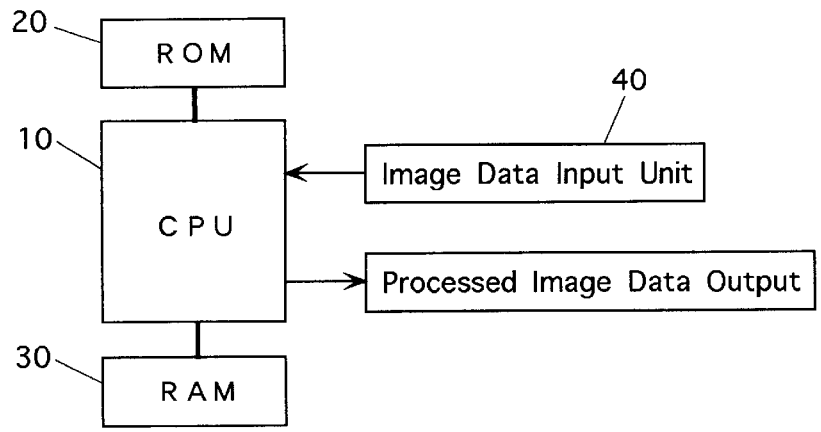
FIG. 1 is a block diagram showing a schematic structure of an example of an image processing device according to the invention.

The image data processing device of the above item (A) will be described below more in detail.

In an example of this processing device, the characteristic parameter extraction means performs an operation for each of said regions for extracting, as the characteristic parameter, a density centroid of the pixels belonging to the region, and the vector calculating means calculates the vector connecting the extracted density centroids.

In this case, the direction of the calculated vector may depend on a difference in density.

The plurality of regions may be four regions surrounding a specific pixel, and each region may be formed of a plurality of pixels.

Further, in this case, and particularly in the case where the density centroid is extracted from each of the four regions, the vector calculating means may calculate two vectors connecting the density centroids in the mutually opposed regions, and the filter producing means may produce the filter of a square having a diagonal formed of the larger of the calculated vectors.

In the case where the density centroids are extracted from three among the four regions, the vector calculating means may calculate three vectors connecting the calculated three density centroids, and the filter producing means may produce a filter of a triangle defined by the calculated three vectors.

In the case where the density centroids are extracted from two among the four regions, the vector calculating means may calculate one vector connecting the calculated two density centroids, and the filter producing means may produce a one-dimensional filter corresponding to the calculated vector.

In the case where a density centroid is not calculated from any one of the four regions, the specific pixel is inverted, if the specific pixel is an effective pixel. For example, in the case where the background is white and the effective pixel is a black pixel, the specific pixel is inverted into white. If the background is black and the effective pixel is a white pixel, the specific pixel is inverted into black. This processing is effective for correction and removal of satellite dots.

In an example of the image data processing device of the above item (B), the detecting means may calculate a vector representing the relationship between the regions based on the characteristic parameters extracted by the extraction means.

The extraction means for extracting the characteristic parameter may calculate a centroid of each of the regions to extract the same as the characteristic parameter. In this case, the extraction means may calculate the centroid of the density of the pixels belonging to each of the regions to extract the characteristic parameter.

The filter producing means may produce the filter having filter components weighted in accordance with the density difference in each region. This is effective in such a case that the input image is a multivalued image, and generation of various jaggies is to be suppressed in the process of binarizing the multivalued image having the density differences between portions.

In this case, the filter producing means may produce a smoothing filter.

In the image data processing device of the above item (C), the detecting means for detecting the correlation between the pixels may calculate a vector representing the relationship between the pixels, and the filter producing means may produce the filter in accordance with the calculated vector.

In the method of processing the image data of the above item (D), the above step (b) may be performed to calculate a density centroid of the pixels belonging to each of the subwindows to extract the characteristic parameter for each of the subwindows, and the above step (c) may be performed to calculate the vector connecting the extracted density centroids.

The plurality of subwindows may be four regions surrounding a specific pixel located at the center of the window.

In this case, and particularly in the case where the density centroid is extracted from each of the four subwindows, the above step (c) may be performed to calculate two vectors connecting the density centroids in the mutually opposed subwindows, and the above step (d) may be performed to produce the filter of a square having a diagonal formed of larger one between the calculated vectors.

In the case where the density centroids are extracted from three among the four subwindows, the above step (c) may be performed to calculate three vectors connecting the calculated three density centroids, and the above step (d) may be performed to produce a filter of a triangle defined by the calculated three vectors.

In the case where the density centroids are extracted from two among the four subwindows, the above step (c) may be performed to calculate one vector connecting the calculated two density centroids, and the above step (d) may be performed to produce a one-dimensional filter corresponding to the calculated vector.

In the case where a density centroid is not calculated from any one of the four subwindows, the above step (e) may be performed to invert the specific pixel, if the specific pixel is an effective pixel.

In the above description, the centroid in the local region is exemplified as the characteristic parameter. However, another parameter such as a moment or a median may be the characteristic parameter.

Preferred embodiments of the invention will be described below with reference to the drawings. FIG. 1 is a block diagram showing a schematic structure of an image data processing device for executing an image data processing method according to the invention.

This image data processing device includes a central processing unit (which will be referred to as "CPU" hereinafter) 10 as well as a read-only memory (which will be referred to as "ROM" hereinafter) 20 and a random access memory (which will be referred to as "RAM" hereinafter) 30 which are connected to the CPU 10.

The CPU 10 operates in accordance with a program stored in the ROM 20. The RAM 30 is used for storage and read of information.

Image data is supplied from an image reader or the like to the CPU 10 via an image data input unit 40, and processed image data is output to a printer or the like.

Image data processing by this image data processing device will be described below.

1. Summary of Processing

Figure 2:
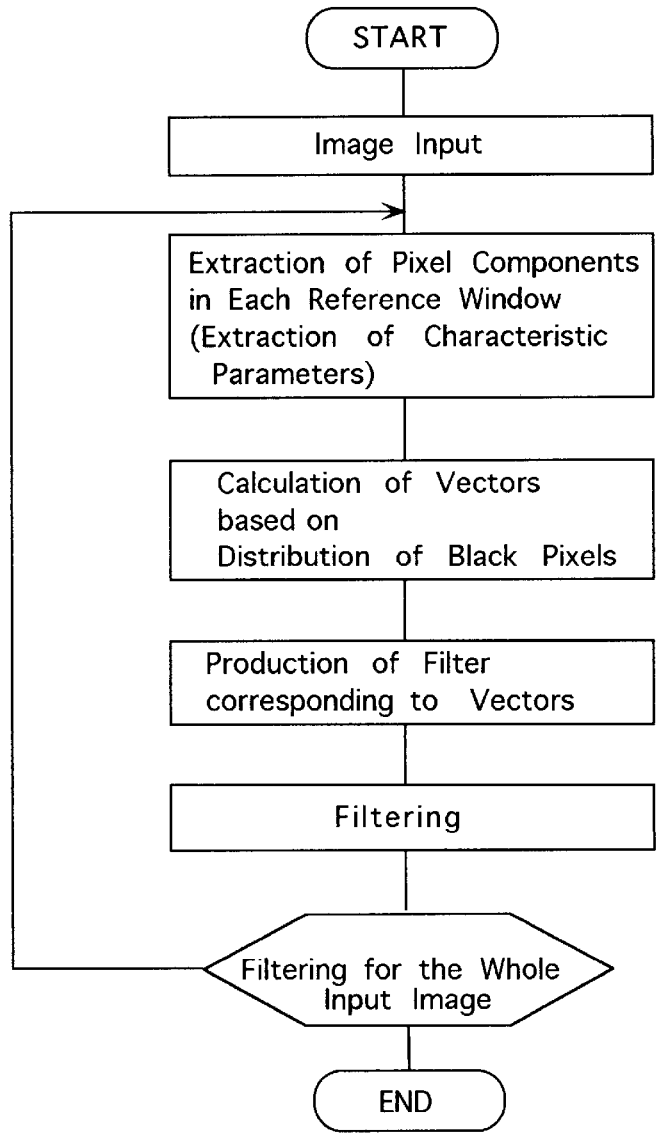
FIG. 2 is a flowchart schematically showing image processing according to the invention.

The image data processing device processes an input image which is a multivalued image or a binary image by effecting filtering on the input image with successively varying filter components, and thereby removes jaggies, discontinuities and satellite dots in the image. For the multivalued image, the device is operable to suppress generation of jaggies, discontinuities and others during binarizing thereof. The filtering is performed based on the following concept. FIG. 2 schematically shows a flowchart of the processing.

(1) Image data sent to the CPU 10 is stored in the RAM 30, which holds the image data of one screen (or one page).

For the image data of one screen stored in the RAM 30, the CPU 10 sets a reference window having the same size as a matrix of a filter, and reads the image data of pixels in the reference window for extracting pixel components. Extraction of the pixel components is performed by dividing the reference window into five areas, i.e., five submatrixes, and obtaining a local characteristic parameter in each area.

(2) In accordance with the extracted pixel components, distributions of the pixels in the reference window are represented by vectors.

(3) By utilizing these vectors, a filter optimum for the image in the reference window is produced, and filtering is performed. The filter and the filtering are determined based on Morphology theory.

(4) When the filtering for the pixels which are read as described above is completed, the reference window is shifted by one pixel, and, for the shifted reference window, the filtering is executed through the steps (1) to (3) described above. For the whole input image, the above filtering is successively executed.

The case where the input image data is binary image data and the case where the input image data is multivalued image data will be individually described below. In the following description, the background is white.

2.2 Details of Processing for Binary Image 2-1. Extraction of Pixel Components

Figure 3:
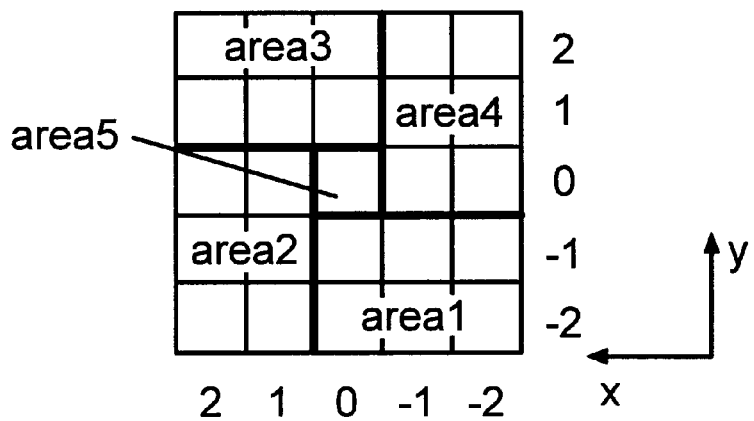
FIG. 3 shows division of a reference window into sub-matrixes (areas)

For the filtering, the matrix size of the filter is first set, and the reference window is also set to the same size. The following description will be given on an example in which the matrix size is 5×5 and a centroid is deemed as a local characteristic parameter. Extraction of the pixel components is performed in such a manner that, as shown in FIG. 3, the reference window is divided into submatrixes (i.e., areas) 1–5, and a geometrical centroid is obtained from coordinate values of black pixels for each of the areas 1–4. The area 5 includes only one pixel. Satellite dot removal will be effected on this area, as will be described later. The centroids thus obtained are utilized for vector expression of the pixel distributions in the reference window, as will be described later. The centroid can be calculated by the following formula (1).

In the formula (1), $(X_{ag}, Y_{ag})$ represents the coordinate of the centroid. The subscripted letter "a" represents 1, 2, 3 or 4, and, in other words, represents the area number. (xi, yi) represents the coordinate values of the black pixel, and n represents the number of the black pixels in the area. If the black pixel is not present in the area, the centroid is not calculated only in this area.

$$(x_{ag}, y_{ag}) = \left( \left[ \frac{1}{n} \sum_{i=0}^{n-1} x_i \right]', \left[ \frac{1}{n} \sum_{i=0}^{n-1} y_i \right]' \right) \quad \text{formula (1)}$$

2-2. Calculation of Vector and Production of Filter

The vectors are calculated from the centroids obtained by the above "Extraction of Pixel Components", and the matrix components of the filter is determined using the vectors. The centroid may not be obtained in one or some areas. The filter is produced by calculating the vectors selectively in the following manners depending on the number of the centroids obtained in the reference window.

(1) Four Centroids

Figure 4A:
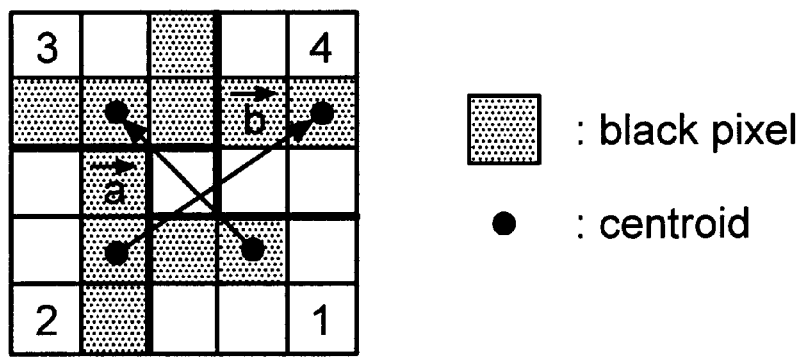
FIGS. 4(A)–4(C) represent an example of processing in a case where four centroids are detected in the reference window, and FIGS. 4(A), 4(B) and 4(C) specifically show a vector calculating method, a produced filer and a result of filtering, respectively.

In this case, the centroids are obtained from all the areas (submatrixes) 1–4 shown in FIG. 3. For example, when the black pixel is present in each of areas 1–4 as shown in FIG. 4(A), the centroid can be obtained from each area.

The coordinate of the centroid in each area can be obtained as follows from the formula (1).

area 1:
$$(x_{1g}, y_{1g}) = \left(\left[\frac{1}{2}(0-1)\right]', \left[\frac{1}{2}(-1-1)\right]'\right) = ([-0.5]', [-1]') = (-1, -1)$$

area 2:
$$(x_{2g}, y_{2g}) = \left(\left[\frac{1}{3}(1+1+1)\right]', \left[\frac{1}{3}(0-1-2)\right]'\right) = ([1]', [-1]') = (1, -1)$$

area 3:
$$(x_{3g}, y_{3g}) = \left(\left[\frac{1}{4}(0+0+1+2)\right]', \left[\frac{1}{4}(1+1+1+2)\right]'\right)$$
$$= ([0.75]', [1.25]')$$
$$= (1, 1)$$

area 4:
$$(x_{4g}, y_{4g}) = \left(\left[\frac{1}{2}(-1-2)\right]', \left[\frac{1}{2}(1+1)\right]'\right) = ([-1.5]', [1]') = (-2, 1)$$

Figures 4B, 4C:
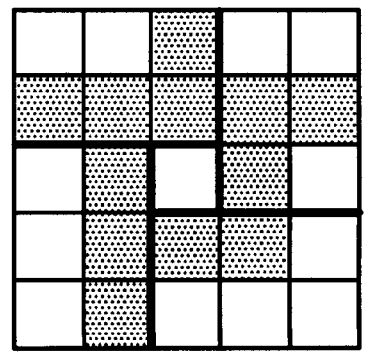

When the centroids are obtained from the four areas, two vectors are calculated from the centroids opposed to each other with the center of the reference window therebetween (i.e., "vector a" from areas 1 and 3, and "vector b" from areas 2 and 4). Then, |vector a| and |vector b| are compared with each other, and the larger one is selected (i.e., "vector b" is selected in FIG. 4(A)). The purpose of this selection is to increase a correction effect by producing an operator which exerts an influence on a larger area. Then, a step is performed to produce a square filter having a filter component, which is formed of an interior of a square having a diagonal formed by the selected vector. The filter thus produced is shown in FIG. 4(B). The filter shown in FIG. 4(B) performs filtering by functioning as a Dilation operator on the Morphology theory. In a general filtering, the noted pixel (i.e., pixel to be processed) is a center pixel (x, y)=(0, 0) of the filter. In this processing, however, the noted pixel is selected from the center of an area of the filter (indicated by 0 in FIG. 4(B)) in order to ensure and increase an effect as the Dilation operator. The noted pixel is determined in such a manner that a mid-point of the "vector b" (i.e., larger vector) is calculated by rounding off the number to the integer, and the pixel which is present at the mid-point coordinate is determined as the noted pixel. When the noted pixel is a white pixel, it is converted into a black pixel. Conversion from a white noted pixel to a black pixel will be described later. Processing for the three, two or one centroid will also be described later. FIG. 4(C) shows a result of filtering which is effected on the state shown in FIG. 4(A). The density of the noted pixel (x, y)=(-1, 0) is converted in density.

(2) Three Centroids

In this case, the centroids can be obtained only from three areas. For example, the black pixels are present in the reference window as shown in FIG. 5(A), and the centroids are obtained therefrom. In this case, vectors are calculated similarly to the case of the above item (1) related to the four centroids, and are specifically calculated from the centroids of the areas opposed to each other with the center therebetween. In the case of FIG. 5(A), a "vector a" is calculated from the areas 1 and 3. Then, two "vectors b and c" are calculated from the starting point and the end point of the "vector a" with respect to the centroid of the remaining area 4, respectively. From the three vectors thus calculated, a triangular filter is produced. The filter component of this triangular filter is formed of an interior of the triangle defined by the calculated three vectors. The produced filter is shown in FIG. 5(B). In this case, the centroid coordinate is calculated from vertexes of the triangle, and the pixel at the centroid coordinate is handled as the noted pixel. A result of processing effected on the state shown in FIG. 5(A) using this filter as the Dilation operator is shown in FIG. 5(C).

(3) Two Centroids

In this case, one vector is calculated from two centroids. For example, the black pixels are present in the reference window and the centroids are obtained as shown in FIG. 6(A). In this case, "vector a" is obtained, and a linear filter corresponding to this vector is produced. The filter thus produced is shown in FIG. 6(B). The noted pixel in this case is the pixel at the mid-point coordinate of the "vector a". FIG. 6(C) shows a result of the processing effected on the state shown in FIG. 6(A) using this filter as the Dilation operator.

(4) One or zero Centroid

In this case, neither calculation of vector nor filtering is performed. However, in the case where a black pixel is not present in any one of the areas 1–4 (centroid is 0), the processing is performed as follows. Only when the black pixel is present in the area 5, the current noted pixel is deemed as the satellite dot, and masking to white is performed. A black pixel spaced from adjacent black pixels by two or more dots is deemed as the satellite dot. An example of processing in this case is shown in FIG. 7.

By executing the above processing on the whole input image, jaggies, discontinuities and satellite dots can be corrected or removed.

Figure 9A:
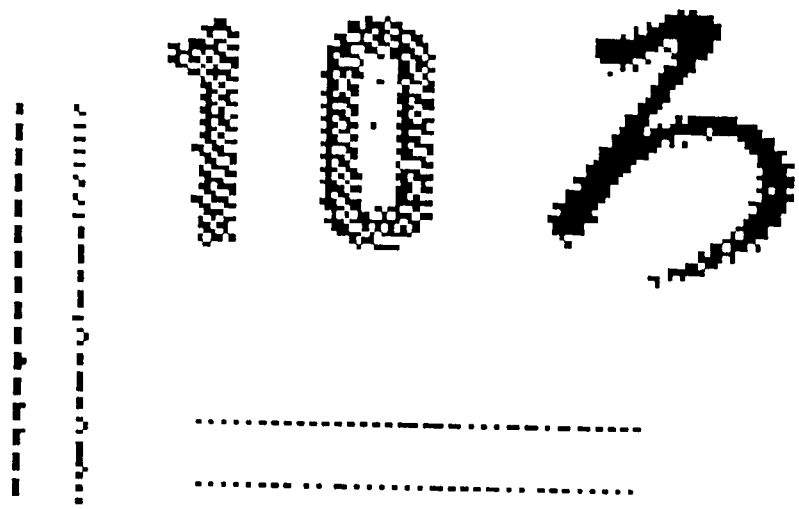
FIGS. 9(A) and 9(B) show examples of correction of a binary image, and specifically
Figure 9B:
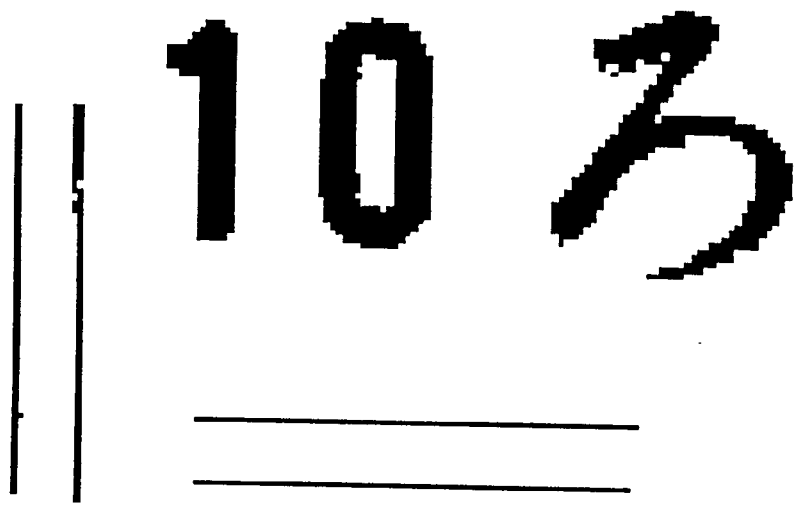

An image shown in FIG. 9(A) is prepared by binarizing a multivalued image in the error diffusion method without correction, and therefore includes jaggies and satellite dots at edges of characters. Also, discontinuities are present at lines. In contrast to this, an image shown in FIG. 9(B) is prepared by performing the foregoing correction according to the invention on the same binary image. As can be seen from FIG. 9(B), in the image after correction by the image data processing according to the invention, the jaggies and others are significantly removed, and the image has smooth edges.

Description will now be given on the correction processing in the case where the input image is the multivalued image.

3. Details of Processing for Multivalued Image

The processing of the multivalued input image is basically similar to that of the binary image. Accordingly, only a difference from the processing of the binary image will be described below. In the following examples, the matrix size and the local characteristic parameters are the same as those for the binary data.

In the processing of the binary image described before, the noted pixel is determined, and is converted into the black pixel. However, in the case of the multivalued image, the noted pixel is determined, and is converted into the pixel of the same density as the maximum density of the pixel in the filter. For weighting, it is converted into the pixel of the same density as the weighted maximum density of the pixel in the filter.

3-1. Extraction of Pixel Components

When the image is the multivalued image, pixels have various densities, so that the calculation of centroid is performed with the following centroid calculation formula (2) instead of the foregoing formula (1). In the formula (2), $(X_{ag}, Y_{ag})$ represents the coordinate of the centroid. The subscripted letter "a" represents one of 1, 2, 3 and 4, and, in other words, represents the area (submatrix) number. $(x_i, y_i)$ represents the coordinate values of the black pixel, and $z_i$ represent the density.

$$(x_{ag}, y_{ag}) = \left( \left[ \frac{\sum z_i x_i}{\sum z_i} \right]', \left[ \frac{\sum z_i y_i}{\sum z_i} \right]' \right) \quad \text{formula (2)}$$

[ ]' represents rounding off.

Figures 8A, 8B, 8C, 8D, 8E:
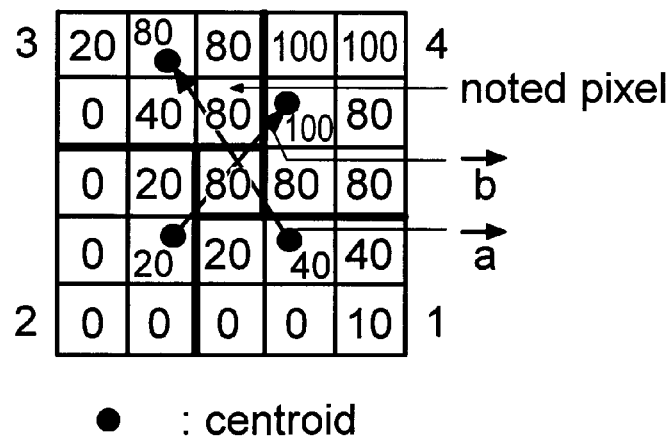
FIGS. 8(A) to 8(E) represent an example of processing of a multivalued image, and specifically.

If $\Sigma Z_i = 0$, $(X_{ag}, Y_{ag}) = (0, 0)$ 3-2. Calculation of Vector and Production of Filter A basic flow of the processing is similar to that for the binary data. In the multivalued image, however, the vector is handled in a three-dimensional manner, so that the centroid having the z-component of a smaller value is handled as the starting point, and the centroid having the z-component of a larger value is handled as the end point. If there is no difference in density, the direction from the area 1 toward area 3 and the direction from the area 2 toward the area 4 are determined as the directions of vectors, similarly to the case of the binary image. By calculating the vectors in this manner, it is possible to determine the direction of edge and the gradient (degree of density change) in the window of 5×5. By utilizing them, the filter component can be weighted, and the effect of correction can be controlled. FIG. 8(A) shows an example of density values of pixels in the reference window and vector calculation. In FIG. 8(A), values (10, 80, 100 and others) in the pixels represent the image density. The centroid coordinates of the respective areas (submatrixes) 1–4 calculated by the formula (2) go to (−1, −1), (1, −1), (1, 2) and (−1, 1), respectively. The densities at the centroid coordinate positions in the areas 1 and 3 are "40" and "80", respectively. Therefore, the starting point and the end point of the "vector a" are set to the centroids (−1, −1) of the area 1 and (1, 2) of the area 3, respectively. The "vector b" for the areas 2 and 4 is determined in a similar manner.

The filter is produced similarly to the case of the binary image, and thus is produced using the larger vector (|vector a| in this case) as the diagonal. The magnitude of the vector is referred only to the x–y plane. The produced filter is shown in FIG. 8(B).

Since the "vectors a and b" represent the direction of the edge and gradient (density difference), these can be used for weighting the filter components and thereby controlling the correction effect. For example, when the error diffusion method is used for binarizing the multivalued image, satellite dots may be produced at edges of which densities rapidly change. In this case, change in density is smoothed by weighting the filter components in accordance with the gradient of the edge, and thereby generation of the satellite dots due to the binarization can be suppressed. An example of the filter having weighted components is shown in FIG. 8(C). The component for the low density portion is weighted to a large extent, and the component for the high density portion is weighted to a small extent, whereby the density correction can be performed appropriately. The weighting in this example is performed in such a manner that −10 and +10 are added to the pixels having the maximum and minimum densities in the area of the filter (i.e., area indicated by 0 in FIG. 8(B)).

FIGS. 8(D) and 8(E) show results of processing using the filters in FIG. 8(B) (non-weighted filter) and FIG. 8(C) (weighted filter) as the Dilation operator.

According to the processing using the non-weighted filter shown in FIG. 8(B), the pixel density of the noted pixel in the filter is converted into the maximum density of 100 in the filter as shown in FIG. 8(D). According to the processing by the weighted filter shown in FIG. 8(C), the pixel density of the noted pixel is converted into the weighted maximum density of (100−10)=90 in the filter as shown in FIG. 8(E).

By effecting the above processing on the whole input image, jaggies, discontinuities and satellite dots can be removed and corrected.

Figure 10A:
FIGS. 10(A) and 10(B) show examples of correction of a multivalued image, and specifically
Figure 10A:
Figure 10B:
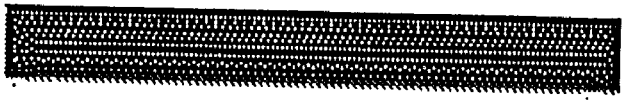
Figure 10B:

FIGS. 10(A) and 10(B) show examples of processing of a multivalued image. FIG. 10(A) shows an image which is binarized in the error diffusion method without correcting the multivalued image. FIG. 10(B) shows an image which is binarized by the error diffusion method after effecting correction (non-weighted processing) according to the invention on the multivalued image.

In the original multivalued image, the density changes rapidly in the downward direction of the edge. In the binary image in FIG. 10(A) which is not processed according to the invention has a large number of satellite dots neighboring to the edge. However, satellite dots are scarcely found in the binary image in FIG. 10(B) which is processed in accordance with the invention.

Although the image processing described above is executed with software, it may be executed with hardware.

When the image data processing of the invention is to be performed with software, a program of the processing described above may be prepared in a form recorded in a record medium which is readable by a computer, so that the image processing device according to the invention may be supplied together with this record medium, and the image processing may be executed with this record medium.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data processing device comprising:
    input means for inputting image data of a plurality of pixels;
    extraction means for setting a plurality of regions for said input image data and extracting characteristic parameters of the respective regions in accordance with states of distributions of the pixels in the respective regions, respectively;
    calculating means for calculating vectors representing relationships between said regions based on the characteristic parameters extracted by said extraction means;
    producing means for producing filters in accordance with the calculated vectors; and
    means for filtering the image data with the produced filters.

2. An image data processing device according to claim 1, wherein said extraction means performs an operation for each of said regions for extracting, as the characteristic parameter, a density centroid of the pixels belonging to the region, and the vector calculating means calculates the vector connecting the extracted density centroids.

3. An image data processing device according to claim 2, wherein the direction of the calculated vector depends on a difference in density.

4. An image data processing device according to claim 3, wherein said plurality of regions are four regions surrounding a specific pixel, and each of said regions is formed of a plurality of pixels.

5. An image data processing device according to claim 4, wherein, when the density centroid is extracted from each of said four regions, said vector calculating means calculates two vectors connecting the density centroids in the mutually opposed regions, and the filter producing means produces the filter of a square having a diagonal formed of larger one between said calculated vectors.

6. An image data processing device according to claim 4, wherein, when the density centroids are extracted from three among said four regions, said vector calculating means calculates three vectors connecting the calculated three density centroids, and the filter producing means produces a filter of a triangle defined by the calculated three vectors.

7. An image data processing device according to claim 4, wherein, when the density centroids are extracted from two among said four regions, the vector calculating means calculates one vector connecting the calculated two density centroids, and the filter producing means produces a one-dimensional filter corresponding to the calculated vector.

8. An image data processing device according to claim 4, wherein, when a density centroid is not calculated from any one of said four regions, said specific pixel is inverted, if said specific pixel is an effective pixel.

9. An image data processing device according to claim 2, wherein, said plurality of regions are four regions surrounding a specific pixel, and each of said regions is formed of a plurality of pixels.

10. An image data processing device according to claim 9, wherein, when the density centroid is extracted from each of said four regions, said vector calculating means calculates two vectors connecting the density centroids in the mutually opposed regions, and the filter producing means produces the filter of a square having a diagonal formed of larger one between said calculated vectors.

11. An image data processing device according to claim 9, wherein, when the density centroids are extracted from three among said four regions, said vector calculating means calculates three vectors connecting the calculated three density centroids, and the filter producing means produces a filter of a triangle defined by the calculated three vectors.

12. An image data processing device according to claim 9, wherein, when the density centroids are extracted from two among said four regions, the vector calculating means calculates one vector connecting the calculated two density centroids, and the filter producing means produces a one-dimensional filter corresponding to the calculated vector.

13. An image data processing device according to claim 9, wherein, when a density centroid is not calculated from any one of said four regions, said specific pixel is inverted, if said specific pixel is an effective pixel.

14. An image data processing device comprising:
input means for inputting image data of a plurality of pixels;
extraction means for setting a plurality of regions for said input image data and extracting characteristic parameters of the respective regions in accordance with states of distributions of the pixels in the respective regions, respectively;
detecting means for detecting correlations between said regions based on the characteristic parameters extracted by said extraction means;
producing means for producing filters in accordance with the detected correlations; and
means for filtering the image data with the produced filters.

15. An image data processing device according to claim 14, wherein the detecting means calculates a vector representing the relationship between said regions based on the characteristic parameters extracted by the extraction means.

16. An image data processing device according to claim 15, wherein said extraction means calculates a centroid of each of said regions to extract the same as the characteristic parameter.

17. An image data processing device according to claim 16, wherein said extraction means calculates the centroid of the density of the pixels belonging to each of said regions to extract the characteristic parameter.

18. An image data processing device according to claim 17, wherein said filter producing means produces the filter having filter components weighted in accordance with the density difference in each of said regions.

19. An image data processing device according to claim 18, wherein said producing means produces a smoothing filter.

20. An image data processing device according to claim 14, wherein each of the regions includes a plurality of pixels.

21. An image data processing device according to claim 14, wherein the extraction means sets the plurality of regions for said input data in one window.

22. An image data processing device according to claim 1, wherein the extraction means sets the plurality of regions for said input data in one window.

23. An image data processing device according to claim 1, wherein the plurality of regions exist simultaneously.

24. An image data processing device according to claim 1, wherein each of the regions includes a plurality of pixels.

25. An image data processing device according to claim 1, wherein each of the vectors expresses both magnitude and direction.

26. An image data processing device comprising:
input means for inputting image data of a plurality of pixels;
extraction means for setting a plurality of regions for said input data, each of the regions including more than one pixel;
detecting means for detecting correlations between the regions based on a pixel distribution of said image data;
producing means for producing filters in accordance with the detected correlations; and
means for filtering said image data with the produced filters.

27. An image data processing device comprising:
input means for inputting image data of a plurality of pixels;
detecting means for detecting correlations between the regions based on a pixel distribution of said image data;
producing means for producing filters in accordance with the detected correlations; and
means for filtering said image data with the produced filters;
wherein said detecting means calculates a vector representing a relationship between the pixels, and said filter producing means produces the filter in accordance with the calculated vector.

28. A method of processing image data comprising the steps of:
(a) setting a window formed of a plurality of pixels for image data, said window having a plurality of subwindows each formed of a plurality of pixels;
(b) extracting a characteristic parameter for each of said subwindows based on a state of distribution of the pixels in each of said subwindows;
(c) calculating vectors representing relationships between said subwindows based on the extracted characteristic parameters;

(d) producing a filter in accordance with the calculated vectors;

(e) filtering said image data with the produced filter; and (f) shifting a position of said window with respect to the image data and repeating said steps (a)–(e).

29. A method of processing image data according to claim 22, wherein said step (b) is performed to calculate a density centroid of the pixels belonging to each of said subwindows to extract the characteristic parameter for each of said subwindows, and said step (c) is performed to calculate the vector connecting the extracted density centroids.

30. A method of processing image data according to claim 29, wherein said plurality of subwindows are four regions surrounding a specific pixel located at the center of said window.

31. A method of processing image data according to claim 24, wherein, when the density centroid is extracted from each of said four subwindows, said step (c) is performed to calculate two vectors connecting the density centroids in the mutually opposed subwindows, and said step (d) is performed to produce the filter of a square having a diagonal formed of larger one between the calculated vectors.

32. A method of processing image data according to claim 30, wherein, when the density centroids are extracted from three among said four subwindows, said step (c) is performed to calculate three vectors connecting the calculated three density centroids, and said step (d) is performed to produce a filter of a triangle defined by the calculated three vectors.

33. A method of processing image data according to claim 24, wherein, when the density centroids are extracted from two among said four subwindows, said step (c) is performed to calculate one vector connecting the calculated two density centroids, and said step (d) is performed to produce a one-dimensional filter corresponding to the calculated vector.

34. A method of processing image data according to claim 30, wherein, when a density centroid is not calculated from any one of said four subwindows, said step (e) is performed to invert the specific pixel, if said specific pixel is an effective pixel.

* * * * *